Dec. 27, 1938.   R. L. CAMPBELL   2,141,343
ELECTRICAL SYSTEM
Filed June 7, 1935

Inventor:-
Richard L. Campbell
by his Attorneys
Howson & Howson

Patented Dec. 27, 1938

2,141,343

UNITED STATES PATENT OFFICE 2,141,343

ELECTRICAL SYSTEM

Richard L. Campbell, Philadelphia, Pa., assignor to Philco Radio and Television Corporation, Philadelphia, Pa., a corporation of Delaware Application June 7, 1935, Serial No. 25,517

17 Claims. (Cl. 178—69.5)

This invention relates to sweep circuits or scanning circuits for picture tubes such as used in the transmission of pictures and like practices. In general, the function of such a circuit is to periodically deflect the electron beam of a picture tube or receiver cathode ray tube with uniform velocity in one direction and to later return the beam to its starting point with considerably higher velocity and then repeat the cycle. The cycle is controlled by means of a periodic synchronizing signal which actuates means in the sweep circuit to supply the necessary output voltage.

A principal object of the invention is to provide an improved sweep circuit having certain inherent advantages as set forth hereinafter.

A further object of the invention is to provide a circuit which is not self-oscillatory and which will generate scanning waves in response to synchronizing signals, but which will not respond again until a predetermined time has elapsed after the occurrence of the preceding synchronizing signal.

Another object of the invention is to provide novel means for rendering the input of the synchronously energized sweep circuit inoperative except during the small time interval necessary for synchronization, whereby extraneous voltages, such as those due to static and the like, are prevented from energizing the circuit.

A further object of the invention is to provide means whereby the timing of the sweep circuit may be made directly responsive to the synchronizing signal, thereby eliminating any time discrepancy between the period or phase, or both, of the output circuit and the synchronizing signal.

A still further object of the invention is to provide means in a sweep circuit whereby the amplitude of the output voltage of the circuit may be made substantially independent of the amplitude of the synchronizing signal.

Still another object of the invention is to provide means in a sweep circuit whereby the return time of the circuit may be made substantially independent of the time duration of the synchronizing signal.

A further object of the invention is to provide means whereby the intensity of the electron beam of the picture tube is diminished if and when the deflecting means are not actuated to the normal degree, thereby preventing the beam from burning the screen of the said tube.

A further object of the invention is to provide a sweep circuit which may be constructed more economically than those used heretofore.

The invention may be fully understood by reference to the accompanying drawing illustrating a specific embodiment, although it will be understood that the invention is not thus limited.

Figure 1:
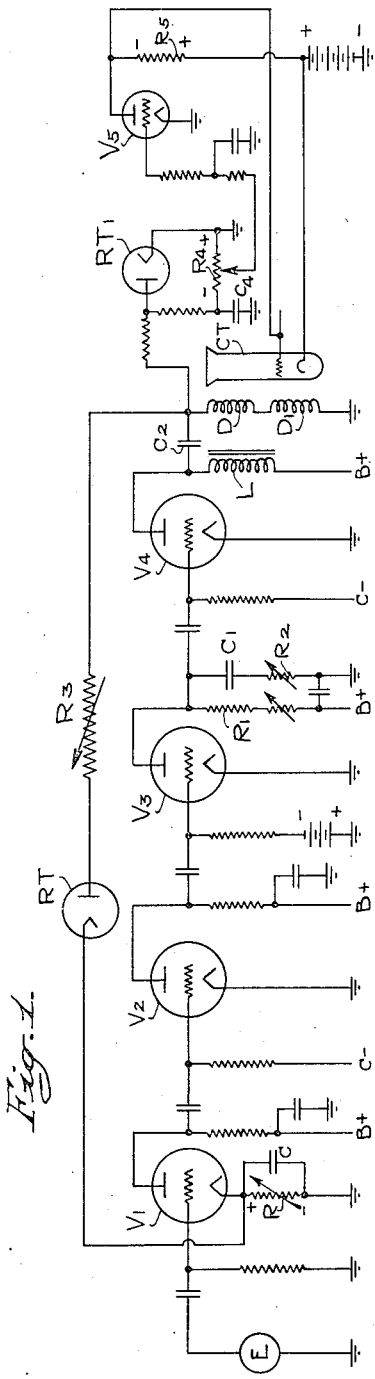
Fig. 1 is a diagrammatic illustration of an embodiment of the novel sweep circuit.
Figure 2:
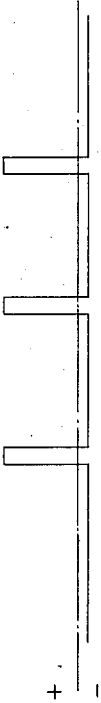
Fig. 2 illustrates a wave form of the synchronizing signal which may be used to actuate the device.

Referring now to Fig. 1, E represents a source of synchronizing signal which is applied to the control grid of the vacuum tube $V_1$. In the cathode circuit of the tube, there may be provided the conventional grid-biasing resistor R and filter condenser C. The output of the tube may be coupled through an odd number of additional tubes to a conventional saw-tooth voltage generator $V_3$, by means of conventional resistance-capacitance coupling circuits. In the specific illustration, the coupling is through a single tube $V_2$ for simplicity of illustration. Inasmuch as the coupling circuits and associated amplifier or amplifiers are conventional, it is unnecessary to describe them in detail.

The saw-tooth voltage generator $V_3$ may be of the conventional form and may have a resistance $R_1$ and shunt capacitance $C_1$ in its anode circuit. A resistance $R_2$ is connected in series with condenser $C_1$ for a purpose which will be explained presently. The output of this generator may be coupled to a power amplifier $V_4$ which, in turn, energizes the deflecting coils D and $D_1$ of the cathode ray or space discharge device CT. The anode of tube $V_4$ may be energized through an inductance coil L and the deflecting coils D and $D_1$ may be connected to the anode of the tube through a blocking condenser $C_2$. The other terminal of the deflecting coils may be connected to ground as illustrated.

In accordance with the invention, the high potential side or terminal of the deflecting coils may be connected through a resistance $R_3$ to the anode of a rectifier RT, which may take the form of a thermionic rectifier as illustrated, although it will be understood that any convenient form of rectifier may be used. The cathode of the rectifier may be connected to the cathode of the input tube $V_1$, and to the ungrounded side of resistor R.

In further accordance with the invention, there is provided means for cutting off the beam of the picture tube when, due to absence of synchronizing signal or for other reasons, the deflecting coils are not energized. If the deflecting coils are not periodically energized, the electron beam of the picture tube would remain stationary and in the absence of means to prevent it, the beam would burn the screen of the tube. The means provided by this invention to prevent this may comprise a rectifier $RT_1$ and a vacuum tube $V_5$ arranged as illustrated in Fig. 1. The anode of the rectifier may be connected to a suitable point of the scanning circuit, for example, to the high potential side of the deflecting coils D and $D_1$ as illustrated. A resistor $R_4$ and a condenser $C_4$ may be cooperatively arranged in relation to the rectifier as clearly shown in Fig. 1. It will be noted that both the resistor and condenser are grounded. The control grid of tube $V_5$ may be connected to a suitable tap on the resistor $R_4$. In the anode circuit of the tube, there may be provided a resistor $R_5$, the extremities of which may be connected respectively to the grid and cathode of the picture tube as illustrated.

The operation of the circuit will now be described. When a synchronizing impulse is applied to the control grid of tube $V_1$, the potential of the control grid becomes less negative, thereby increasing the current through the tube, as is well known. The synchronizing signal is amplified by the tube $V_2$ and by any additional amplifier that may be provided and the amplified signal is applied to the control grid of the saw-tooth voltage generator tube $V_3$, with substantially the same wave form but with larger amplitude. The control grid of tube $V_3$ is biased sufficiently negative so that the tube is substantially cut off or blocked, excepting when the positive peak of the synchronized signal is applied. Consequently, the condenser $C_1$ will tend to charge slowly through the high resistance $R_1$, producing the gradually sloping portion of the saw-tooth wave shown in Fig. 3. During the peak of the synchronizing signal, however, the potential of the control grid of tube $V_3$ becomes much less negative, allowing current to flow in the tube and materially reducing its plate-to-cathode resistance. As a result of this action, the condenser $C_1$ is rapidly discharged through the relatively low plate-to-cathode resistance. The resistance $R_2$ causes a large return voltage peak, as clearly shown in Fig. 3. The voltage across the condenser and resistance is amplified and reversed in phase by the amplifier $V_4$ and the resulting voltage is used to energize the deflecting coils D and $D_1$.

Figure 3:
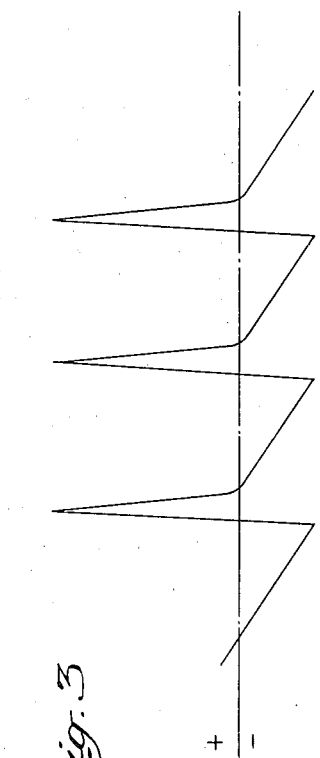
Fig. 3 illustrates the wave form of the output voltage which may be used to deflect the electron beam in the picture tube.

As seen in Fig. 3, the voltage across the deflecting coils becomes highly positive for a short time and then becomes negative for a much longer time interval. During the latter interval, the voltage is negative and decreases in magnitude in a substantially uniform manner. Due to the presence of the condenser, the zero voltage point of the wave form will adjust itself so that the areas above and below the zero voltage line of Fig. 3 will be equal. In other words, for a short period of time in each cycle, the voltage across the deflecting coils D and $D_1$ will have a highly positive value, this period corresponding to the time when the synchronizing signal peak is applied to the input circuit. During the interval when no synchronizing signal is applied and while the electron beam is being slowly swept across the desired area, the voltage across the deflecting coils will be negative.

When the voltage across the deflecting coils becomes positive during the short interval above mentioned, current will flow through the resistance $R_3$, the rectifier tube RT, and the resistor R, thus causing a voltage to be set up across R having the polarity indicated in Fig. 1. The condenser C shunted about resistor R acquires a similar charge. When the voltage across the deflecting coils becomes negative, the condenser C is prevented from discharging through the deflecting coil circuit by virtue of the rectifier RT, and consequently the condenser must discharge through the resistor R. By proper design, a sufficiently large voltage may be established across resistor R to completely block the tube $V_1$. In other words, the cathode of the tube may be made sufficiently positive with respect to the control grid that small variations in the grid voltage will have no effect on the tube. This biasing voltage will gradually diminish and the time constant of the circuit RC may be such that the bias voltage is effective to block the tube until just before the next synchronizing signal is applied to it.

Thus, it will be seen that during a short interval in each cycle of operation, the input tube is not blocked, allowing the synchronizing signal to pass through to the deflecting coils. This positive voltage is utilized to establish the biasing voltage across resistor R through the medium of resistor $R_3$ and rectifier RT. The bias voltage is effective during the remainder of the cycle by virtue of the time constant of RC until just before the next synchronizing impulse is applied.

The effective blocking of the circuit during the time when no synchronizing signal is applied prevents extraneous voltages, such as might be due to static or the like, from energizing the circuit. It will be noted further that the circuit functions to control the amplitude of the output voltage. For example, if the amplitude of the output voltage should increase, the input tube $V_1$ will acquire a larger biasing voltage and, therefore, the biasing voltage remaining when the next synchronizing signal is applied will be greater than usual and will diminish the effective amplitude of the synchronizing signal. Consequently, the amplitude of the signal applied to the saw-tooth voltage generator $V_3$ will be less than normal and this will reduce the amplitude of the output voltage. On the other hand, should the amplitude of the output voltage become less than normal, the circuit will function in a reverse manner to increase the amplitude of the next synchronizing signal, thereby bringing the amplitude of the output voltage back to normal.

It is important to note also that by virtue of the over-all time constant of the circuit, the return time of the sweep circuit may be maintained constant independently of the duration of the synchronizing signal. In other words, when the voltage across the deflecting coils D and $D_1$ becomes positive, the tube $V_1$ is immediately blocked or cut off and, even though the synchronizing signal should tend to be positive for a time longer than usual, the tube $V_1$ will be blocked and the latter part of the synchronizing signal will not be effective.

Another important feature of the circuit is that it requires no manual adjustment, the control energy being derived directly from the synchronizing signal itself and the values of the circuit RC and resistor $R_3$ being such as to insure the proper amplitude of biasing voltage and the time over which such voltage is effective. The circuit is also quite flexible in that a wide range of operation is possible, depending upon the values assigned to the elements R, C, and R₃. It will be understood, of course, that these elements may be adjustable. For example, resistance R₃ may be adjustable to adapt the circuit for different numbers of lines per frame to be scanned. When the circuit is once adjusted for a certain frequency, however, it requires no further manual control. Inasmuch as the circuit requires no manual control, it is particularly adapted for use by inexperienced persons. For example, it is very well adapted for use in television receivers and when thus used will insure proper synchronization of the picture without requiring manual adjustment.

A further feature of the invention is the device for diminishing the intensity of the electron beam of the picture tube, or for cutting off the beam, when the amplitude of deflection is reduced to less than a safe value. As shown in Fig. , the plate current of tube V₅, corresponding to zero grid potential, flows through the resistor R₅ and develops thereacross a voltage having the polarity indicated. In the absence of any control, this voltage is of sufficient value to bias the grid of the picture tube sufficiently negative with respect to the cathode to render the tube inoperative. During each cycle, however, the positive voltage which develops across the deflecting coils L and D₁ is applied to the anode of the rectifier T₁, causing current flow through the rectifier and as a result of current flow through resistor R₄, there is built up across this resistor a voltage having the polarity indicated. This voltage has a time constant which is fixed or determined by the values of the resistor R₄ and the condenser C₄. The voltage across R₄ is applied to the grid of tube V₅ to negatively bias the grid, thereby decreasing the anode current of the tube. As a result, the biasing voltage across resistor R₅ is reduced sufficiently to permit the picture tube to function and to properly bias it.

The biasing voltage originating in the circuit R₄, C₄ and which builds up during each cycle has a time constant such that the picture tube is enabled to function as long as the scanning circuit remains operative. If the scanning circuit should become inoperative, however, the consequent failure of the biasing voltage developed in the circuit R₄, C₄ will permit the voltage across resistor R₅ to rise to its full value, thereby applying such a negative bias to the grid of the picture tube as to render the same inoperative. Thus, this feature of the invention insures that the screen of the picture tube will not be burned by the electron beam owing to absence of deflecting signals.

It will be seen that the biasing voltage across resistor R₅ may be reduced proportionately to the voltage applied to the deflecting coils, and, therefore, the intensity or amplitude of the electron beam of the picture tube may increase proportionately to the deflection in one direction of the beam. It will be noted also that when the beam is deflected less than a predetermined amount, the biasing voltage across resistor R₅ may be allowed to increase, thereby diminishing the intensity of the beam.

While the invention is directed particularly to a scanning circuit, it will be understood that it may be employed in any instance where the several features or any of them may find useful application. Any such use of the inventive features is deemed to be within the scope of the invention.

Although the invention has been described with specific reference to a single embodiment, it may be modified without departing from the principles thereof and any such modifications are, therefore, deemed to be within the scope of the invention as defined by the appended claims.

I claim:

1. In an electrical system, means for forming a pulse signal in response to an input signal of one polarity with respect to a predetermined reference level, a saw-tooth voltage generator, means for supplying said pulse signal to said generator, means for causing said generator to produce a sharp-peak signal, means responsive to said sharp-peak signal for building up a unidirectional voltage of opposite polarity with respect to said reference level, means for combining said built-up voltage with an input signal, and means to dissipate said built-up voltage.

2. In an electrical system, means for forming a pulse signal in response to an input signal of one polarity with respect to a predetermined reference level, a saw-tooth voltage generator, means for supplying said pulse signal to said generator, means for causing said generator to produce a sharp-peak signal, a space current discharge device having an electron beam, mean for deflecting said electron beam, means for supplying said sharp-peak signal to said deflecting means, means responsive to said sharp-peak signal for building up a unidirectional voltage of opposite polarity with respect to said reference level, means for combining said built-up voltage with an input signal, and means to dissipate said built-up voltage.

3. In an electrical system, a space discharge device arranged to receive successive time-spaced signal pulses of one polarity, said device having an input circuit and an output circuit, means for supplying said pulses to said input circuit, means supplied with signal energy by said device in response to a received signal pulse for building up in said input circuit a unidirectional voltage of opposite polarity and of such magnitude that said device is biased thereby to an inoperative point, and means for dissipating the built-up biasing voltage at a time rate such that the said device is rendered inoperative to incoming signals until the time the next succeeding signal pulse is to be received, whereby the system is non-receptive for a time interval after each successive signal pulse.

4. In an electrical system, a space discharge device arranged to receive successive time-spaced signal pulses of one polarity, said device having an input circuit and an output circuit, means for supplying said pulses to said input circuit, means supplied with signal energy by said device in response to a received signal pulse for building up in said input circuit a unidirectional voltage of opposite polarity and of such magnitude that said device is biased thereby to an inoperative point, and means including a time circuit for dissipating the built-up biasing voltage at a time rate such that the said device is rendered inoperative to incoming signals until the time the next succeeding signal pulse is to be received, whereby the system is non-receptive for a time interval after each successive signal pulse.

5. In an electrical system, a space discharge device arranged to receive successive time-spaced signal pulses of one polarity, said device having an input circuit and an output circuit, means for supplying said pulses to said input circuit, means supplied with signal energy by said device in response to a received signal pulse for building up in said input circuit a unidirectional voltage of opposite polarity and of such magnitude that said device is biased thereby to an inoperative point, means including a time circuit for dissipating the built-up biasing voltage at a time rate such that the said device is rendered inoperative to incoming signals until the time the next succeeding signal pulse is to be received, whereby the system is non-receptive for a time interval after each successive signal pulse, said time circuit comprising a capacitance element and a resistance element, and means for varying one of said elements to vary the time constant of the time circuit.

6. In an electrical system, a space discharge device arranged to receive successive time-spaced signal pulses of one polarity, said device having an input circuit and an output circuit, means for supplying said pulses to said input circuit, means supplied with signal energy by said device in response to a received signal pulse for building up in said input circuit a unidirectional voltage of opposite polarity and of such magnitude that said device is biased thereby to an inoperative point, said last-named means including a rectifier, and means for dissipating the built-up biasing voltage at a time rate such that the said device is rendered inoperative to incoming signals until the time the next succeeding signal pulse is to be received, whereby the system is non-receptive for a time interval after each successive signal pulse.

7. In an electrical system, a space discharge device arranged to receive successive time-spaced signal pulses of one polarity, said device having an input circuit and an output circuit, means for supplying said pulses to said input circuit, means supplied with signal energy by said device in response to a received signal pulse for building up in said input circuit a unidirectional voltage of opposite polarity and of such magnitude that said device is biased thereby to an inoperative point, said last-named means including a rectifier and a resistance, and means for dissipating the built-up biasing voltage at a time rate such that the said device is rendered inoperative to incoming signals until the time the next succeeding signal pulse is to be received, whereby the system is non-receptive for a time interval after each successive signal pulse.

8. In an electrical system, a space discharge device arranged to receive successive time-spaced signal pulses of one polarity, said device having an input circuit and an output circuit, means for supplying said pulses to said input circuit, means supplied with signal energy by said device in response to a received signal pulse for forming a different pulse signal, means responsive to said formed pulse signal for building up a unidirectional voltage of opposite polarity and of sufficient magnitude to bias said device to an inoperative point, means for applying said built-up voltage to said input circuit, and means for dissipating the built-up biasing voltage at a time rate such that the said device is rendered inoperative to incoming signals until the time the next succeeding signal pulse is to be received, whereby the system is non-receptive for a time interval after each successive signal pulse.

9. In an electrical system, a space discharge device arranged to receive successive time-spaced signal pulses of one polarity, said device having an input circuit and an output circuit, means for supplying said pulses to said input circuit, means supplied with signal energy by said device in response to a received signal pulse for forming a different pulse signal, means for modifying the average potential of said formed pulse signal, means responsive to the modified pulse signal for building up a unidirectional voltage of opposite polarity and of sufficient magnitude to bias said device to an inoperative point, means for applying said built-up voltage to said input circuit, and means for dissipating the built-up biasing voltage at a time rate such that the said device is rendered inoperative to incoming signals until the time the next succeeding signal pulse is to be received, whereby the system is non-receptive for a time interval after each successive signal pulse.

10. In an electrical system, a source of successive time-spaced pulse signals, signal amplifying means having an input circuit and an output circuit, the amplification of said means varying with the voltage in said input circuit, means for supplying said time-spaced pulse signals to said amplifying means, means energized by said amplified pulse signals for forming another pulse signal, means for deriving control energy from said other pulse signal and for utilizing said energy to build up a unidirectional voltage in said input circuit of such polarity and magnitude as to decrease the amplification of said amplifying means to substantially zero, and means comprising a time circuit for dissipating said built-up voltage during the interim between successive pulses of said time-spaced pulse signals, whereby said amplifying means is blocked for a substantial portion of the said interim but transmits the time-spaced pulses.

11. In an electrical system, a source of successive time-spaced pulse signals, signal amplifying means having an input circuit and an output circuit, the amplification of said means varying with the voltage in said input circuit, means for supplying said time-spaced pulse signals to said amplifying means, means energized by said amplified pulse signals for forming another pulse signal having an amplitude dependent upon the amplitude of said amplified signal, means for deriving control energy from said other pulse signal and for utilizing said energy to build up a unidirectional voltage in said input circuit of such polarity and magnitude as to decrease the amplification of said amplifying means to substantially zero, and means comprising a time circuit for dissipating said built-up voltage during the interim between successive pulses of said time-spaced pulse signals, whereby said amplifying means is blocked for a substantial portion of the said interim but transmits the time-spaced pulses.

12. In an electrical system, a source of successive time-spaced pulse signals, signal amplifying means having an input circuit and an output circuit, the amplification of said means varying with the voltage in said input circuit, means for supplying said time-spaced pulse signals to said amplifying means, means energized by said amplified pulse signals for forming another pulse signal having an amplitude dependent upon the amplitude of said amplified signal, means for deriving control energy from said other pulse signal, means including a rectifier for utilizing said energy to build up a unidirectional voltage in said input circuit of such polarity and magnitude as to decrease the amplification of said amplifying means to substantially zero, and means comprising an adjustable time circuit for dissipating said built-up voltage during the interim between successive pulses of said time-spaced pulse signals, whereby said amplifying means is blocked for a substantial portion of the said interim but transmits the time-spaced pulses.

13. In an electrical system, a source of successive time-spaced pulse signals, signal amplifying means having an input circuit and an output circuit, the amplification of said means varying with the voltage in said input circuit, means for supplying said time-spaced pulse signals to said amplifying means, means energized by said amplified pulse signals for forming another pulse signal having an amplitude dependent upon the amplitude of said amplified signal, means for deriving control energy from said other pulse signal, means including a rectifier and a resistance for utilizing said energy to build up a unidirectional voltage in said input circuit of such polarity and magnitude as to decrease the amplification of said amplifying means to substantially zero, and means comprising a time circuit for dissipating said built-up voltage during the interim between successive pulses of said time-spaced pulse signals, whereby said amplifying means is blocked for a substantial portion of the said interim but transmits the time-spaced pulses.

14. In an electrical system, a source of successive time-spaced pulse signals, signal amplifying means having an input circuit and an output circuit, the amplification of said means varying with the voltage in said input circuit, means for supplying said time-spaced pulse signals to said amplifying means, means energized by said amplified pulse signals for forming another pulse signal having an amplitude dependent upon the amplitude of said amplified signal, means for deriving control energy from said other pulse signal, means including a rectifier and an adjustable resistance for utilizing said energy to build up a unidirectional voltage in said input circuit of such polarity and magnitude as to decrease the amplification of said amplifying means to substantially zero, and means comprising an adjustable time circuit for dissipating said built-up voltage during the interim between successive pulses of said time-spaced pulse signals, whereby said amplifying means is blocked for a substantial portion of the said interim but transmits the time-spaced pulses.

15. In a television synchronizing system, a source of successive time-spaced synchronizing pulses, a signal transfer stage for transferring said synchronizing pulses, connections from said source to said stage for supplying the synchronizing pulses thereto, amplifier and pulse-shaping means having an output circuit, constructed and arranged to form in its output circuit another pulse signal, the wave shape of the formed pulses being different from the wave shape of the synchronizing pulses but each of said formed pulses being initiated by a corresponding synchronizing pulse, connections for supplying synchronizing pulses from said transfer stage to said amplifier and pulse-shaping means to control the operation thereof, and a circuit for deriving signal energy from the said output circuit and supplying it to said signal transfer stage to prevent the transfer of signals by the transfer stage after the inception of each formed pulse signal has been initiated.

16. In a television synchronizing system, a source of successive time-spaced synchronizing pulses, a signal transfer stage for transferring said synchronizing pulses, connections from said source to said stage for supplying the synchronizing pulses thereto, amplifier and pulse-shaping means having an output circuit, constructed and arranged to form in its output circuit another pulse signal, the wave shape of the formed pulses being different from the wave shape of the synchronizing pulses but each of said formed pulses being initiated by a corresponding synchronizing pulse, connections for supplying synchronizing pulses from said transfer stage to said amplifier and pulse-shaping means to control the operation thereof, and a circuit for deriving signal energy from the said output circuit and supplying it to said signal transfer stage to prevent the transfer of the later part of each synchronizing pulse by the transfer stage after the inception of each formed pulse signal has been initiated.

17. In a television synchronizing system, a source of successive time-spaced synchronizing pulses, a signal transfer stage for transferring said synchronizing pulses, connections from said source to said stage for supplying the synchronizing pulses thereto, amplifier and pulse-shaping means having an output circuit, constructed and arranged to form in its output circuit another pulse signal, the wave shape of the formed pulses being different from the wave shape of the synchronizing pulses but each of said formed pulses being initiated by a corresponding synchronizing pulse, connections for supplying synchronizing pulses from said transfer stage to said amplifier and pulse-shaping means to control the operation thereof, and a circuit for deriving a narrow pulse signal from the said output circuit and supplying it to said signal transfer stage to prevent the transfer of signals by the transfer stage after the inception of each formed pulse signal has been initiated.

RICHARD L. CAMPBELL.